(12) United States Patent
Miller

(10) Patent No.: US 8,316,469 B2
(45) Date of Patent: Nov. 27, 2012

(54) GARMENT FOR AIDING IN WALKING OF PET

(76) Inventor: Renee L. Miller, Canton, MI (US)

( * ) Notice: Subject to any disclaimer, the term of this patent is extended or adjusted under 35 U.S.C. 154(b) by 217 days.

(21) Appl. No.: 12/851,240

(22) Filed: Aug. 5, 2010

(65) Prior Publication Data
US 2012/0030861 A1 Feb. 9, 2012

(51) Int. Cl.
*A41D 13/00* (2006.01)
(52) U.S. Cl. ........................ 2/227; 2/247; 2/79
(58) Field of Classification Search .............. 2/227, 228, 2/221, 247, 76, 219, 222, 236
See application file for complete search history.

(56) References Cited

U.S. PATENT DOCUMENTS

| | | | | |
|---|---|---|---|---|
| 683,029 A * | 9/1901 | Estes | ................................. | 2/251 |
| 1,582,813 A * | 4/1926 | Ballin | ................................ | 2/253 |
| 1,708,786 A * | 4/1929 | Cohen | ............................... | 2/247 |
| 1,970,110 A * | 8/1934 | Vaccaro | ............................ | 2/247 |
| 2,042,282 A * | 5/1936 | Tworoger | .......................... | 2/247 |
| 2,356,715 A * | 8/1944 | Webster | ........................ | 119/776 |
| 2,501,338 A * | 3/1950 | Kass | .................................. | 2/250 |
| 2,663,876 A * | 12/1953 | Miller et al. | ........................ | 2/227 |
| 2,709,815 A * | 6/1955 | Nelson | .............................. | 2/247 |
| 2,967,307 A * | 1/1961 | O'Donnell | ......................... | 2/253 |
| 3,104,650 A * | 9/1963 | Grahling | ........................ | 119/770 |
| 3,130,416 A * | 4/1964 | Mitchell et al. | ...................... | 2/79 |
| D221,327 S * | 8/1971 | Watts | ............................. | D2/857 |
| 3,840,901 A * | 10/1974 | Eyster | .............................. | 2/247 |
| 3,871,030 A * | 3/1975 | Green | ............................... | 2/238 |
| 3,908,875 A * | 9/1975 | Wilson et al. | ................... | 224/254 |
| 4,079,871 A * | 3/1978 | Sica | ................................ | 224/677 |
| 4,218,781 A * | 8/1980 | Lieberman | ......................... | 2/247 |
| 4,303,239 A * | 12/1981 | Walsh, Jr. | ....................... | 482/105 |
| 4,613,991 A * | 9/1986 | Grover | .................................. | 2/23 |
| 4,879,972 A * | 11/1989 | Crowe et al. | .................... | 119/792 |
| 5,038,719 A * | 8/1991 | McDonough | ................... | 119/772 |
| 5,080,045 A | 1/1992 | Reese et al. | | |
| 5,161,486 A * | 11/1992 | Brown | ........................... | 119/795 |
| D350,628 S * | 9/1994 | Williams | ...................... | D30/153 |
| 5,517,696 A * | 5/1996 | Krugler | ............................. | 2/250 |
| 5,560,321 A * | 10/1996 | Hess | .............................. | 119/858 |
| 5,634,215 A * | 6/1997 | DeBaene | ........................... | 2/227 |
| 5,718,189 A * | 2/1998 | Blake | ............................ | 119/770 |
| 5,809,576 A * | 9/1998 | Huston et al. | ...................... | 2/247 |
| 5,870,777 A * | 2/1999 | Hans | .................................. | 2/238 |
| 5,878,441 A * | 3/1999 | Busker et al. | ....................... | 2/247 |
| 5,884,338 A * | 3/1999 | Golde | ................................ | 2/247 |
| 5,890,637 A * | 4/1999 | Furneaux | ....................... | 224/191 |
| 5,950,569 A * | 9/1999 | Perrulli | ........................... | 119/770 |
| 6,016,772 A * | 1/2000 | Noyes | ............................ | 119/863 |
| 6,039,677 A * | 3/2000 | Spletzer | ......................... | 482/105 |

(Continued)

*Primary Examiner* — Khoa Huynh
*Assistant Examiner* — Richale Quinn
(74) *Attorney, Agent, or Firm* — Harness, Dickey & Pierce, P.L.C.

(57) ABSTRACT

A garment that includes a garment structure, a plurality of loop members, and first, second and third pocket assemblies. Each loop member is coupled to a waist portion of the garment structure and remains attached thereto in response to the application of a leash force of 37 lbf thereto. The first pocket assembly is configured to hold a plurality of disposable plastic bags and defines an opening through which the disposable plastic bags can be dispensed. The second pocket assembly is configured to receive one or more of the disposable plastic bags that have been filled with pet excrement. Each third pocket assembly is coupled to the lower portion of the garment structure and is configured to hold a tennis ball therein.

17 Claims, 4 Drawing Sheets

U.S. PATENT DOCUMENTS

| | | | | |
|---|---|---|---|---|
| 6,095,093 | A * | 8/2000 | Kisko et al. | 119/770 |
| 6,105,169 | A * | 8/2000 | Colorado | 2/81 |
| 6,192,835 | B1 * | 2/2001 | Calhoun et al. | 119/792 |
| 6,199,232 | B1 * | 3/2001 | Kocivar | 5/502 |
| 6,253,379 | B1 * | 7/2001 | Collier | 2/108 |
| 6,308,335 | B1 * | 10/2001 | Colorado | 2/81 |
| 6,418,881 | B1 | 7/2002 | Starratt | |
| 6,684,408 | B2 * | 2/2004 | Rindle et al. | 2/108 |
| 6,769,139 | B1 * | 8/2004 | Goldkind | 2/247 |
| 6,851,393 | B2 * | 2/2005 | Bremm | 119/770 |
| 6,978,484 | B2 * | 12/2005 | Donlan et al. | 2/227 |
| 7,003,810 | B2 * | 2/2006 | Goldkind | 2/227 |
| 7,058,987 | B2 * | 6/2006 | Salazar | 2/247 |
| 7,073,462 | B1 * | 7/2006 | Layman | 119/161 |
| 7,162,746 | B2 * | 1/2007 | Reynolds | 2/87 |
| D572,434 | S * | 7/2008 | Yeates et al. | D2/742 |
| D580,629 | S * | 11/2008 | Adams et al. | D2/742 |
| D586,085 | S * | 2/2009 | Lounsbury, Jr. | D2/742 |
| 7,707,658 | B2 * | 5/2010 | Culhane | 2/227 |
| 7,908,675 | B2 * | 3/2011 | Robinson | 2/247 |
| 2001/0052532 | A1 * | 12/2001 | Perez et al. | 224/575 |
| 2004/0187183 | A1 * | 9/2004 | Hautala | 2/24 |
| 2005/0120464 | A1 * | 6/2005 | Clark | 2/247 |
| 2005/0229292 | A1 * | 10/2005 | Watkins et al. | 2/227 |
| 2005/0251895 | A1 * | 11/2005 | Farrah et al. | 2/227 |
| 2007/0028349 | A1 * | 2/2007 | Watson | 2/69 |
| 2008/0216212 | A1 * | 9/2008 | Burgess et al. | 2/228 |
| 2008/0289082 | A1 * | 11/2008 | Harris | 2/251 |
| 2009/0282600 | A1 * | 11/2009 | Robinson | 2/79 |
| 2010/0031415 | A1 * | 2/2010 | Shadid | 2/87 |
| 2011/0247128 | A1 * | 10/2011 | DiSanto et al. | 2/236 |
| 2012/0030861 | A1 * | 2/2012 | Miller | 2/221 |
| 2012/0117705 | A1 * | 5/2012 | Hawkins et al. | 2/23 |
| 2012/0158041 | A1 * | 6/2012 | Craig | 606/203 |

* cited by examiner

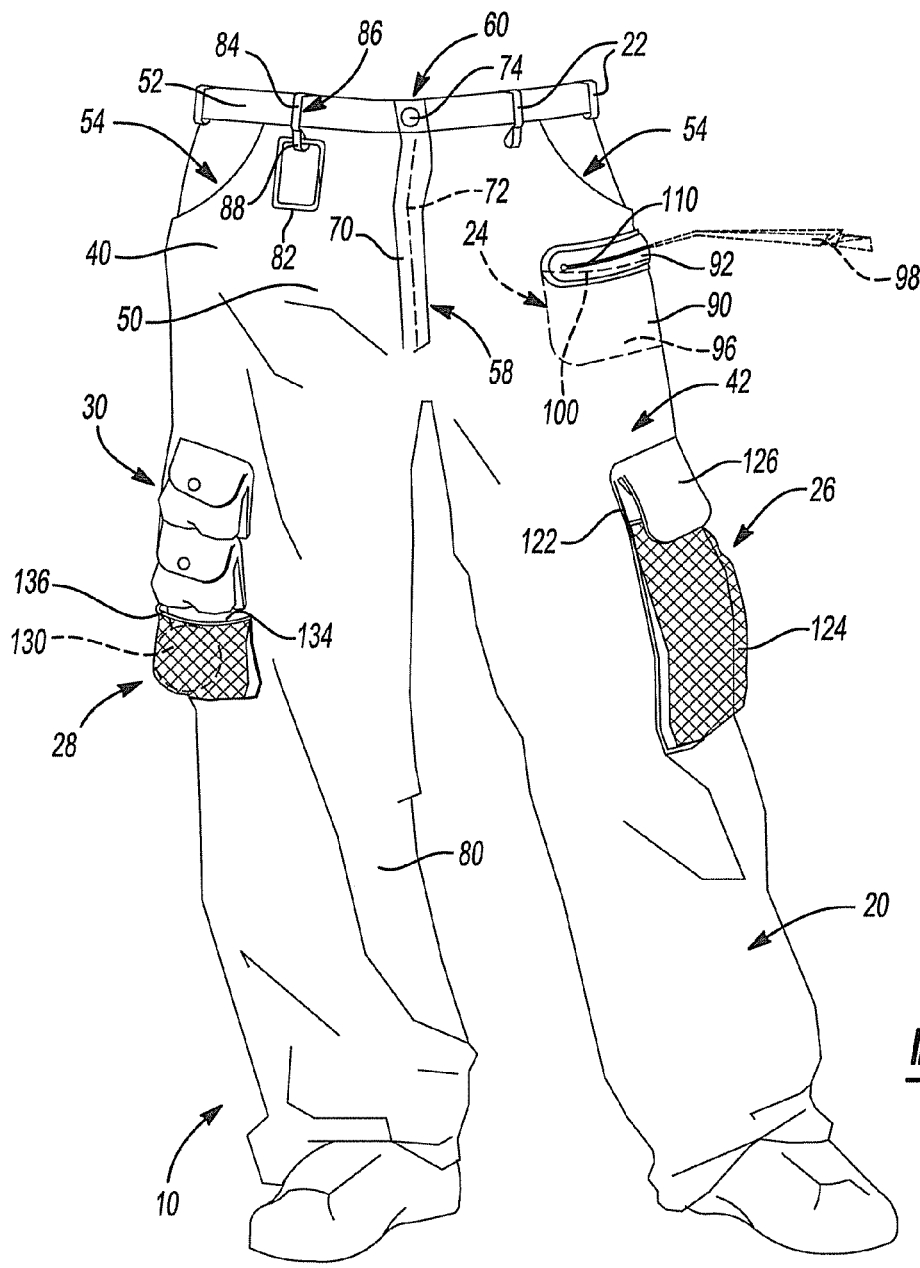
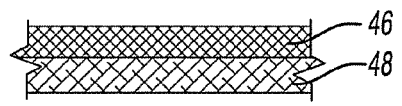

GARMENT FOR AIDING IN WALKING OF PET

FIELD

The present disclosure relates to a garment that is adapted to aid the wearer in the task of walking one or more pets.

BACKGROUND

This section provides background information related to the present disclosure which is not necessarily prior art.

Various carrying devices for transporting pet supplies are known in the art. These devices typically include a satchel or bag-like container that includes a strap or belt that permits the device to be worn on the hip of the user or slung over the shoulder of the user. I have found that such devices are not as convenient as is desired and moreover that some of these devices are difficult to use in situations where multiple dogs are being walked. Accordingly, there remains a need in the art for an improved device for transporting pet supplies.

SUMMARY

This section provides a general summary of the disclosure, and is not a comprehensive disclosure of its full scope or all of its features.

In one form, the teachings of the present disclosure provide a garment for aiding in the walking of a pet. The garment includes a garment structure, a plurality of loop members, a first pocket assembly, a second pocket assembly and at least one third pocket assembly. The garment structure is formed of fabric and has a waist portion and a lower portion that is coupled to a lower end of the waist portion. The waist portion is configured to fit around the waist of a user of the garment. The lower portion is configured to receive the legs of the user therethrough. Each of the loop members are coupled to the waist portion and remain attached thereto in response to the application of a leash force of 37 lbf thereto. The first pocket assembly, which is coupled to lower portion, is configured to hold a plurality of disposable plastic bags. The first pocket assembly defines an opening through which the disposable plastic bags can be dispensed. The second pocket assembly is removably coupled to the lower portion of the garment structure and is configured to receive one or more of the disposable plastic bags that have been filled with pet excrement. Each third pocket assembly is coupled to the lower portion of the garment structure and is configured to hold a tennis ball therein.

In still another form, the present teachings provide a combination leash and belt that includes a leash body, a handle coupled to a first end of the leash body and a pair of loops coupled to a second end of the leash body that are configured to receive the handle in a serpentine manner.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a perspective view of a garment constructed in accordance with the teachings of the present disclosure, the garment being worn by a wearer;

FIG. 1A is a cross-sectional view of a portion of the garment of FIG. 1 illustrating a two-ply construction of the garment structure;

Corresponding reference numerals indicate corresponding parts throughout the several views of the drawings.

DETAILED DESCRIPTION

Figure 2:
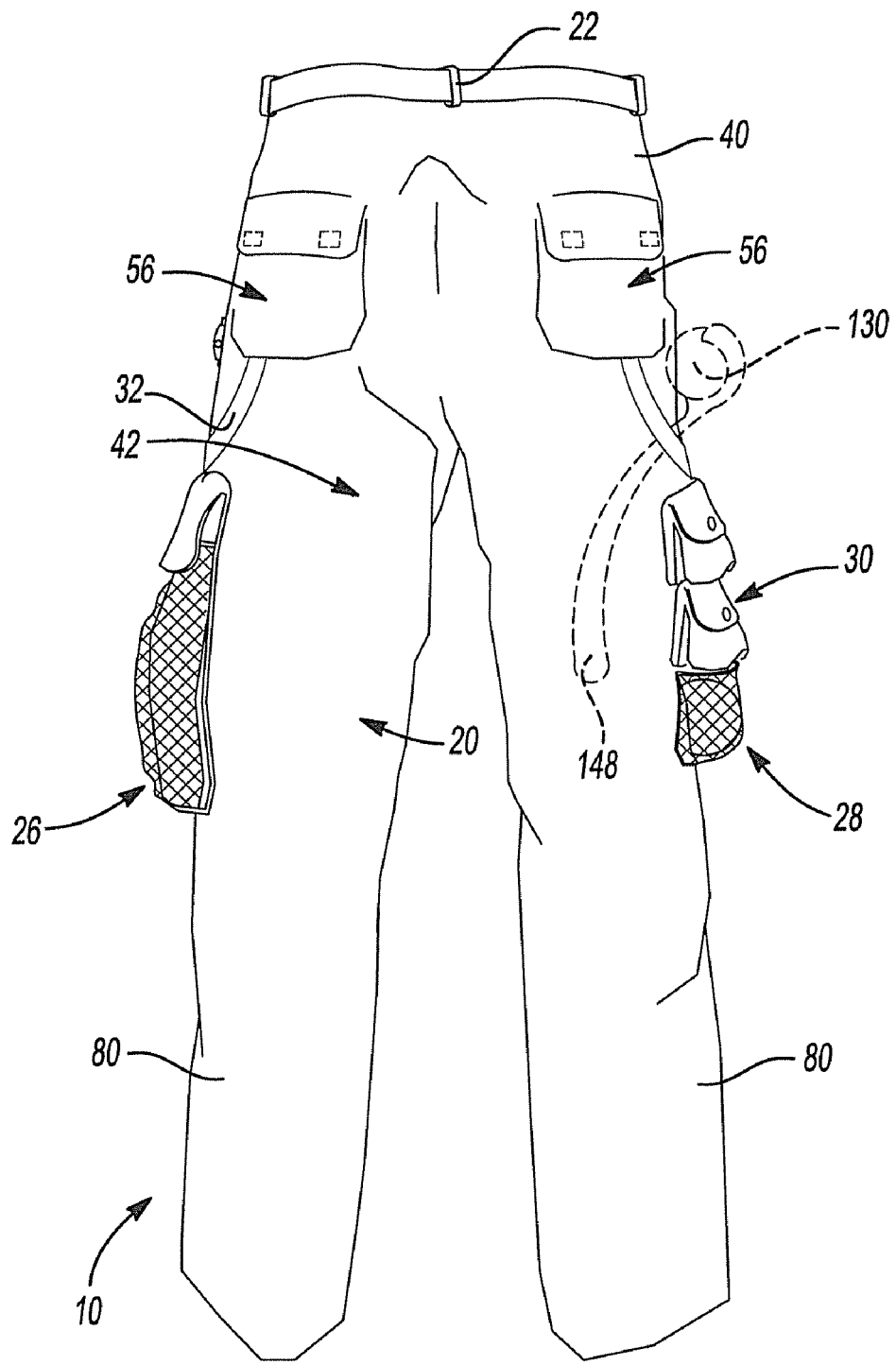
FIG. 2 is a rear perspective view of the garment of FIG. 1.
Figure 5:
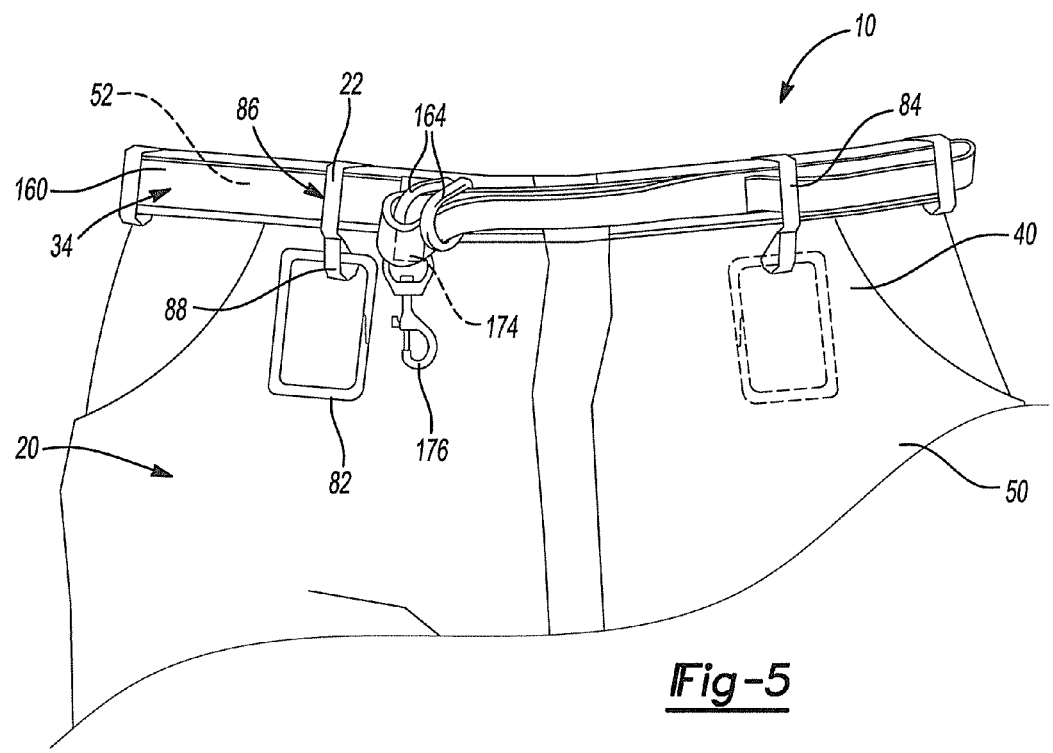
FIG. 5 is a front elevation of a portion of the garment of FIG. 1 illustrating an accessory in operative association with the garment.
Figure 6:
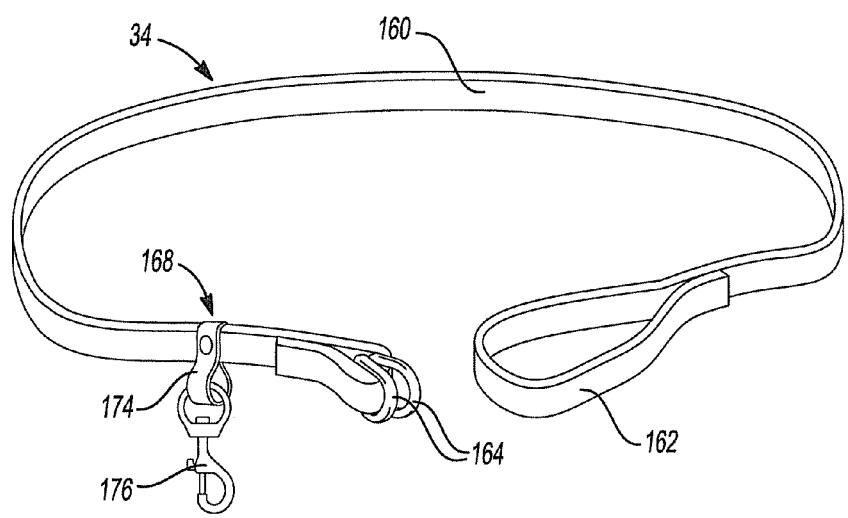
FIG. 6 is a perspective view of the accessory illustrated in FIG. 5.

With reference to FIGS. 1 and 2 of the drawings, a garment constructed in accordance with the teachings of the present disclosure is generally indicated by reference numeral 10. The garment 10 can include a garment structure 20, a plurality of loop members 22, a first pocket assembly 24, a second pocket assembly 26, at least one third pocket assembly 28, at last one fourth pocket assembly 30, and a retainer 32. If desired, the garment 10 can further include an accessory, such as a combination leash and belt 34, which is shown in FIGS. 5 and 6.

The garment structure 20 can be formed of any desired combination of fabric or sheet materials, and can comprise a waist portion 40 and a lower portion 42 that is coupled to a lower end of the waist portion 40. In the particular example provided, the garment structure 20 comprises an outer nylon shell 46 (FIG. 1A) with a breathable, waterproof inner layer (e.g. GORE-TEX®) 48 (FIG. 1A), but it will be appreciated that the garment structure 20 may be formed in from a single ply of fabric or material that may or may not be treated to be waterproof or water repellant. While the garment structure 20 depicted in the figures is configured as a pair of pants, it will be appreciated that the garment structure 20 could also be configured as a skirt, a pair of shorts, a kilt, or capris.

Figures 3, 4:
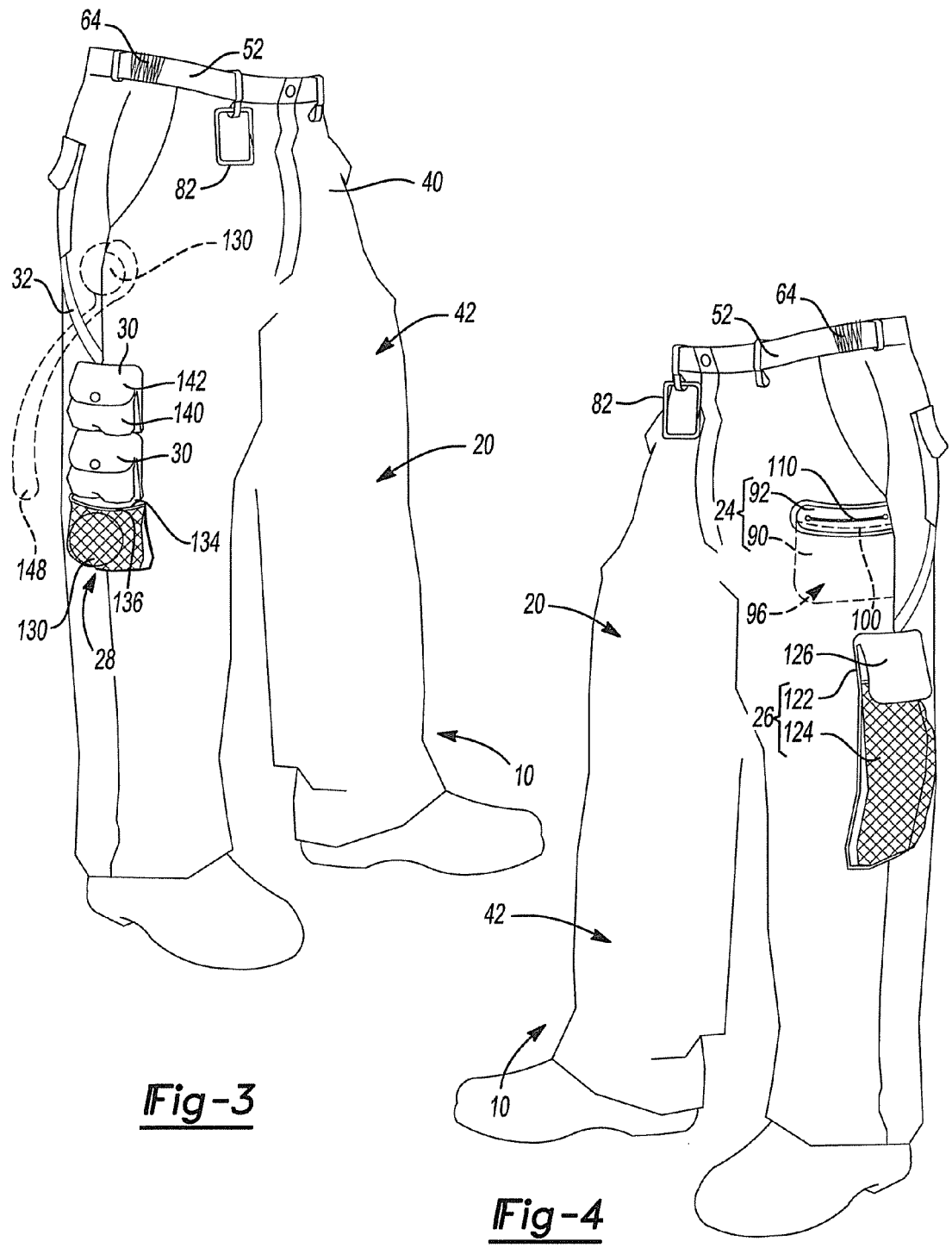
FIGS. 3 and 4 are right and left side perspective views of the garment of FIG. 1.

The waist portion 40 can be configured to conform to the waist of the wearer of the garment 10 and can comprise a garment member 50, a waistband 52, one or more front pockets 54, one or more rear pockets 56, a fly 58 and a fly closure 60. The waistband 52 can be fixedly coupled to an upper end of the garment member 50 to form the upper border of the garment 10, those of skill in the art will appreciate that the waist portion 40 may be configured otherwise such that the waistband 52 is disposed between the upper and lower borders (ends) of the garment 10. The waistband 52 can be at least partly formed of elastic 64 (FIGS. 3 and 4). The front pocket(s) 54 and rear pocket(s) 56 can be formed in any desired manner, and may be formed in whole or in part by a discrete portion of material that is fixedly coupled to the garment member 50. The fly 58 can comprise an inner flap (not specifically shown) and an outer flap 70 that may be overlaid onto the inner flap and secured thereto via the fly closure 60. In the example provided, the fly closure 60 comprises a conventional zipper 72 and a conventional snap fitting 74, but those of skill in the art will appreciate that various other types of closure means may be employed, including hook-and-loop type fasteners (e.g., VELCRO®), buttons, etc. In situations where the fly 58 and fly closure 60 are not incorporated into a garment constructed in accordance with the teachings of the present disclosure, it will be appreciated that a means may be provided to constrict the waistband 52 about the wearer of the garment 10, such as elastic (e.g., an elastic band) or a draw string.

The lower portion 42 can be fixed or fixedly and removably coupled to a lower end of the waist portion 40 and can be configured to shroud at least a portion of the wearer's legs. In the particular example provided, the lower portion comprises two sleeve-like structures 80 that are integrally formed with the garment member 50. It will be appreciated, however, that fastening devices, for example zippers, buttons, or hook-and-loop fasteners, could be employed to removably couple the sleeve-like structures 80 to the waist portion 40.

The loop members 22 can be fixedly coupled to the garment structure 20 at a location that is comfortable for the wearer. In the particular example provided, the loop members 22 are fixedly coupled to the waist portion 40 and span the waistband 52. In some embodiments, the loop members 22 can be employed to retain a conventional belt (not shown) and/or the combination leash and belt 34 (FIG. 5) and can extend about all or a portion of the waistband 52. In such situations, the loop members 22 can be secured to the garment structure 20 such that a predetermined minimum force can be applied to the loop member 22 without causing the loop member 22 or its connection to the garment structure 20 to fail. The predetermined force can be greater than or equal to about 32 lbf, and preferably greater than or equal to about 37 lbf, and more preferably greater than or equal to about 42 lbf and still more preferably greater than or equal to about 45 lbf.

If desired, one or more rings 82, such as round or D-rings and/or carabineers, can be coupled to associated ones of the loop members 22. The ring(s) 82 can be employed to secure a leash of a leashed dog to facilitate "hands free" restraint of the dog. The ring(s) 82 could also be employed to couple keys, ID tags, etc. In some situations it may be desirable to fixedly couple one at least a portion of the ring(s) 82 to corresponding ones of the loop members 22. For example, each corresponding one of the loop members 22 can comprise a first loop portion 84, which can cooperate with the waist portion 40 to define a first loop 86 for receipt of a belt or combination belt and leash 34 (FIG. 5), and a second loop 88 that does not intersect the first loop 86. The second loop 88 could be formed by a corresponding one of the loop members 22 and the waist portion 40, or could be formed by entirely by the corresponding one of the loop members 22. In this example, the ring 82 is received in the second loop 88 but is not received in the first loop 86.

With reference to FIGS. 1 and 4, the first pocket assembly 24 can be fixedly coupled to the garment structure 20 at a desired location, such as to the lower portion 42, and can include a pocket member 90 and a flap member 92. The pocket member 90 can be coupled to the garment structure 20 in a conventional manner and can define a storage cavity 96, which is configured to receive one or more disposable plastic bags 98 therein, and a pocket opening 100 through which the storage cavity 96 can be accessed. The flap member 92 can be coupled to the garment structure 20 proximate the pocket opening 100 and can be configured to close the pocket opening 100. The flap member 92 may be releasably secured to the garment structure 20 via one or more hook-and-loop fastener, but any other type of fastener, including snaps, zippers, and buttons, could be used in the alternative. The flap member 92 can define a flap opening 110 that can be configured to dispense plastic bags 98 held in the storage cavity 96. In the particular example provided, the flap opening 110 comprises a slit-like opening formed in the flap member 92, but those of skill in the art will appreciate that the flap opening 110 can be shaped and sized in any desired manner. Alternatively, the flap member 92 can be secured to the pocket structure 90 via two spaced apart fasteners such that a space for dispensing the disposable plastic bags 98 is formed between the pocket structure 90, the flap member 92 and the spaced apart fasteners. As another alternative, the opening 110 can be formed in the pocket member 90 and the flap member 92 can be omitted altogether.

In the example provided, the disposable plastic bags 98 are mounted on a roll and are attached in a serial manner to one another via a set of perforations. The roll is disposed in the storage cavity 96 and the free end of the disposable plastic bags 98 is received through the flap opening 110 so as to be graspable by the wearer of the garment 10 without having to lift the flap member 92 or reach into the storage cavity 96. It will be appreciated, however, that the disposable plastic bags 98 need not be pre-packaged, and that the disposable plastic bags 98 could be pre-packaged in another manner. One alternative manner of packaging of the disposable plastic bags 98 involves interleaved discrete and separate disposable plastic bags that are packaged in a plastic film container having a slit or opening formed therein through which the disposable plastic bags 98 can be withdrawn. The interleaving of the disposable plastic bags 98 with one another is similar to the packaging of disposable paper tissue (e.g., KLEENEX®) and facilitates the partial withdrawal of a second, sequentially next disposable plastic bag 98 through the flap opening 110 when the disposable plastic bag 98 extending therethrough (i.e., the first disposable plastic bag 98) is pulled away from the first pocket assembly 24 to completely withdraw the first disposable plastic bag 98 and to partly withdraw a next or second disposable plastic bag 98.

The second pocket assembly 26 can be a container-like structure that can be removably coupled to the garment structure 20 in a desired area, such as on the lower portion 42 in an area corresponding to the lateral side of the wearer's thigh between the knee and the waist. The second pocket assembly 26 can comprise a pocket structure 120 that can be formed of one or more materials, such as waterproof (non-porous) materials, and can be unitarily formed to define a pocket and a flap. In the example illustrated, however, the pocket structure 120 includes a back member 122, which is formed of a waterproof material, and a front member 124 that can be formed of a waterproof netting or stretchable mesh material that is fixedly coupled to the back member 124 on three sides so as to define a container opening. Any desired type of fastener can be employed to removably couple the second pocket assembly 26 to the garment structure 20, including hook-and-loop fasteners, zippers, and snaps. The second pocket assembly 26 can be configured to receive one or more of the disposable plastic bags 98 that have been used to hold the excrement of a dog that is being walked by the wearer of the garment 10. If desired, a flap 126 can be secured to the back member 122 or to the garment structure 20; the flap 126 can be employed to cover the opening between the back member 122 and the front member 124. It will be appreciated that the fastener permits the second pocket assembly 26 to be easily and rapidly removed from the remainder of the garment 10 so that the second pocket assembly 26 can be separately stored and/or cleaned.

With reference to FIGS. 1 and 3, each of the third pocket assemblies 28 can be configured to receive a tennis ball 130 therein and can be fixedly coupled to the garment structure 20 in a desired area, such as on the lower portion 42 in an area corresponding to the lateral side of the wearer's thigh between the knee and the waist on a side of the garment 10 opposite the second pocket assembly 26. The third pocket assembly 28 can have an open top 134 through which the tennis ball 130 can be received. The third pocket assembly 28 can be formed of a suitable resilient material, such as an elastic mesh that can be fixedly coupled to the garment structure 20, or could be formed of a material that is bounded with an elastic material (i.e., an elastic band 136) at its distal end. Alternatively, the third pocket assembly 28 can be sized somewhat larger than a tennis ball 130 such that the portion of the third pocket assembly 28 situated above the tennis ball 130 can be secured, e.g., to the garment structure 20 or a flap (not shown) that is associated with the third pocket assembly 28, with a desired fastener (e.g., hook-and-loop type fastener, buttons, snap, zipper) so that the flap can selectively close the third pocket assembly 28.

Each fourth pocket assembly 30 can be coupled to the garment structure 20 in a desired location and can comprise a pocket structure 140 and a flap 142 that can be releasably secured to the pocket structure 140 to close the fourth pocket assembly 30. The pocket structure 140 and, if desired, the flap 142, can be formed of a desired material, such as a breathable and waterproof material, and can be employed to store treats (not shown) for a dog or small articles such as a cell phone.

With reference to FIGS. 2 and 3, the retainer 32 can be configured to releasably hold a tennis ball thrower 148 (shown in broken line) of the type that is sold by various retailers, such as PETCO, under the CHUCKIT! trademark. In the particular example provided, the retainer 32 comprises a loop 150 of material that is secured to the garment structure 20 at a convenient and comfortable location, such as a lateral side of the waist portion 40.

With reference to FIGS. 5 and 6, the combination leash and belt 34 can comprise a leash body 160, a handle 162, a connector 164 and a dropper 168. The leash body 160 and the handle 162 can be unitarily formed of a strap-like member formed of a suitable material, such as a nylon webbing. The strap member can be secured to itself in a suitable manner (e.g., sewn) at a first end of the leash body 160 to form a loop that can at least partly constitute the handle 162. The connector 164 can be coupled to a second, opposite end of the leash body 160 and configured to receive the first end in a manner that permits the combination leash and belt 34 to be selectively (and if desired, adjustably) looped around the waistband 52. Exemplary connectors include conventional components such as belt buckles, web strap buckles, D-rings, slide release buckles and bolt-snaps 170. In the particular example provided, the connector 164 comprises a pair of D-rings. The dropper 168 can include a loop member 174, which can be fixedly coupled to the leash body 160, and a bolt snap 176 that can be configured to be releasably attached to the collar of a dog. The loop member 174 can be formed of any suitable material, such as a material similar or identical to that of the leash body 160 or a metal loop (e.g., round ring, D-ring or rectangular ring). The bolt snap 176 can be coupled to a distal end of the loop member 174 and can extend in a direction away from the leash body 160. When the combination leash and belt 34 is to be used as a belt, it may be threaded through the plurality of loop members 22 and its opposite ends can be coupled to one another via the connector 164 to secure it to the waist of the wearer. When the combination leash and belt 34 is to be used as a leash, the connector 164 may be manipulated to uncouple the opposite ends of the combination leash and belt 34, the combination leash and belt 34 can be removed from the plurality of loop members 22 and the bolt snap 170 and/or 176 can be coupled to the collar of a dog.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A garment for aiding in the walking of a pet, the garment comprising:
    a garment structure formed of fabric, the garment structure having a waist portion and a lower portion that is coupled to a lower end of the waist portion, the waist portion being configured to fit around the waist of a user of the garment, the lower portion being configured to receive the legs of the user therethrough;
    a plurality of loop members coupled to the waist portion, each of the loop members remaining attached to the waist portion in response to the application of a leash force of 37 lbf thereto;
    a first pocket assembly coupled to the garment structure, the first pocket assembly defining an opening, the first pocket assembly being configured to hold a plurality of disposable plastic bags that are dispensed through the opening, the disposable plastic bags being adapted for the receipt and disposal of pet excrement;
    a second pocket assembly that is removably coupled to the lower portion of the garment structure, the second pocket assembly being configured to receive one or more of the disposable plastic bags when filled with pet excrement; and
    at least one third pocket assembly that is coupled to the lower portion of the garment structure, each third pocket assembly being configured to hold a tennis ball therein; wherein a ring or carbiner is coupled to one of the plurality of loop members; and wherein each loop member comprises a first loop portion, which cooperates with the waist portion to define a first loop, the first loop is fixedly coupled to the waist portion, and a second loop portion that is fixedly coupled to the first loop portion, wherein the second loop portion at least partly defines a second loop that does not intersect the first loop, and wherein the ring or carbiner is received in the second loop but not the first loop.

2. The garment of claim 1, wherein the first pocket assembly includes a pocket portion and a flap that can be releasably secured to the pocket portion, the opening being defined in the flap.

3. The garment of claim 1, further comprising a combination leash and belt that is received through the plurality of loop members, the combination leash and belt comprising a handle portion and a hook.

4. The garment of claim 1, wherein the second pocket assembly includes a pocket structure having a back member that is formed of a waterproof material.

5. The garment of claim 4, wherein the pocket structure is entirely formed of the waterproof material.

6. The garment of claim 4, wherein the pocket structure has a front member that is fixedly coupled to the back member and wherein the front member is formed of a netting.

7. The garment of claim 1, wherein the second pocket assembly includes a pocket structure and wherein a hook-and-loop fastener couples the pocket structure to the garment structure.

8. The garment of claim 1, wherein the garment structure is formed as a pair of pants, a pair of shorts, a kilt or a skirt.

9. The garment of claim 1, wherein the garment structure is at least partly formed of nylon.

10. The garment of claim 9, wherein the garment structure includes a breathable and waterproof layer.

11. The garment of claim 1, wherein each third pocket assembly is configured with an open top.

12. The garment of claim 11, wherein each third pocket assembly includes an elastic band member that constricts the open top.

13. The garment of claim 1, further comprising a fourth pocket assembly coupled to the lower portion, the fourth pocket assembly having a pocket structure and a flap that is releasably secure-able to the pocket structure.

14. The garment of claim 13, wherein the pocket structure is releasably secured to the lower portion.

15. The garment of claim 1, further comprising a loop mounted on the lower portion of the garment structure.

16. The garment of claim 1, wherein the waist portion includes an elastic waistband.

17. A garment for aiding in the walking of a pet, the garment comprising:
- a garment structure formed of fabric in the form of a pair of pants, a pair of shorts, a kilt or a skirt, the garment structure having a waist portion and a lower portion that is coupled to a lower end of the waist portion, the waist portion being configured to fit around the waist of a user of the garment and comprising an elastic waistband, the lower portion being configured to receive the legs of the user therethrough;
- a plurality of loop members coupled to the waist portion, each of the loop members remaining attached to the waist portion in response to the application of a leash force of 42 lbf thereto;
- a ring or carabiner is coupled to one of the plurality of loop members;
- a first pocket assembly coupled to the garment structure, the first pocket assembly defining an opening, the first pocket assembly being configured to hold a plurality of disposable plastic bags that are dispensed through the opening, the disposable plastic bags being adapted for the receipt and disposal of pet excrement, the first pocket assembly including a pocket portion and a flap that can be releasably secured to the pocket portion, the opening being defined in the flap;
- a second pocket assembly that is removably coupled to the lower portion of the garment structure with a hook-and-loop fastener, the second pocket assembly being configured to receive one or more of the disposable plastic bags when filled with pet excrement, the second pocket assembly including a pocket structure having a back member that is formed of a waterproof material
- at least one third pocket assembly that is coupled to the lower portion of the garment structure, each third pocket assembly being configured to hold a tennis ball therein and having an open top; and
- a combination leash and belt that is received through the plurality of loop members, the combination leash and belt comprising a handle portion and a hook;
- wherein each loop member comprises a first loop portion, which cooperates with the waist portion to define a first loop, the first loop is fixedly attached to the waist portion, and a second loop portion that is fixedly coupled to the first loop portion, wherein the second loop portion at least partly defines a second loop that does not intersect the first loop, and wherein the ring or carabiner is received in the second loop but not in the first loop.

* * * * *